(12) United States Patent
Pandey et al.

(10) Patent No.: US 12,511,234 B2
(45) Date of Patent: Dec. 30, 2025

(54) MANAGING A PROGRAMMABLE CACHE CONTROL MAPPING TABLE IN A SYSTEM LEVEL CACHE

(71) Applicant: NVIDIA CORPORATION, Santa Clara, CA (US)

(72) Inventors: Ashutosh Pandey, Bangalore (IN); Steven E. Molnar, Chapel Hill, NC (US); Mirko Andjic, San Jose, CA (US); Amit Pabalkar, Fremont, CA (US); Harold W. Cain, III, Raleigh, NC (US); Prabal Sharma, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 40 days.

(21) Appl. No.: 18/506,007

(22) Filed: Nov. 9, 2023

(65) Prior Publication Data

US 2025/0156321 A1    May 15, 2025

(51) Int. Cl.
 *G06F 12/0802* (2016.01)
(52) U.S. Cl.
 CPC ...... *G06F 12/0802* (2013.01); *G06F 2212/60* (2013.01)
(58) Field of Classification Search
 None
 See application file for complete search history.

(56) References Cited

U.S. PATENT DOCUMENTS

| | | | | |
|---|---|---|---|---|
| 7,856,530 | B1 * | 12/2010 | Mu | G06F 12/0888 711/119 |
| 8,219,752 | B1 * | 7/2012 | Jenkins | H04L 67/2885 711/E12.017 |
| 12,032,488 | B1 * | 7/2024 | Ma | G06F 12/1027 |
| 2014/0181413 | A1 | 6/2014 | Manne et al. | |
| 2015/0026406 | A1 | 1/2015 | Mclellan et al. | |

(Continued)

OTHER PUBLICATIONS

Non Final Office Action received for U.S. Appl. No. 18/505,952, dated Jan. 28, 2025, 12 pages.

(Continued)

*Primary Examiner* — Yaima Rigol
*Assistant Examiner* — Elias Young Kim
(74) *Attorney, Agent, or Firm* — Squire Patton Boggs LLP; Sarah Mirza

(57) ABSTRACT

Various embodiments include techniques for managing cache memory in a computing system. The disclosed techniques include a cache policy manager that monitors activity of various components that access a common cache memory. The cache policy manager establishes cache rules that determine what data remains stored in cache memory and what data is removed from cache memory in order to make room for new data. As the activities of these components change over time, cache rules that work well for a previous activity profile may no longer work well for the current activity profile. Therefore, the cache policy manager dynamically modifies the cache rules as the activity profile changes in order to select cache rules at any given time that work well with the current activity profile. These techniques are advantageous over conventional approaches that employ static cache rules that work well only for specific activity profiles.

20 Claims, 6 Drawing Sheets

(56) References Cited

U.S. PATENT DOCUMENTS

| | | | |
|---|---|---|---|
| 2015/0058535 A1* | 2/2015 | Lasser | G11C 16/3495 |
| | | | 711/103 |
| 2016/0085670 A1* | 3/2016 | Huang | G06F 13/1673 |
| | | | 711/154 |
| 2016/0350232 A1* | 12/2016 | Knies | G06F 12/0888 |
| 2017/0076758 A1* | 3/2017 | Waugh | G11C 5/148 |
| 2020/0012602 A1 | 1/2020 | Zhao et al. | |
| 2020/0104264 A1* | 4/2020 | Khandual | G06F 16/9024 |
| 2020/0233800 A1* | 7/2020 | Ramini | G06F 12/0802 |
| 2022/0292015 A1* | 9/2022 | Klimov | G06F 21/64 |
| 2023/0161701 A1 | 5/2023 | Kim | |
| 2023/0185723 A1 | 6/2023 | Ge | |
| 2023/0418753 A1 | 12/2023 | Patel et al. | |

OTHER PUBLICATIONS

Final Office Action received for U.S. Appl. No. 18/505,952 dated May 15, 2025, 12 pages.

Notice of Allowance received for U.S. Appl. No. 18/505,952, dated Sep. 18, 2025, 12 pages.

* cited by examiner

MANAGING A PROGRAMMABLE CACHE CONTROL MAPPING TABLE IN A SYSTEM LEVEL CACHE

BACKGROUND

Field of the Various Embodiments

Various embodiments relate generally to computing system architectures and, more specifically, to managing a programmable cache control mapping table in a system level cache.

Description of the Related Art

A computing system generally includes, among other things, one or more processing units, such as central processing units (CPUs) and/or graphics processing units (GPUs), and one or more memory systems. An interconnect facilitates communication among the various components of the computing system, including CPUs, GPUs, auxiliary processors, video and/or audio streaming devices, network adapters, and/or the like. These components of the computing system execute various processes, also referred to herein as work, on behalf of one or more application programs. The interconnect also facilitates communication between the components of the computing system and a shared memory system, referred to as the system memory. In some embodiments, the system memory is implemented with dynamic random access memory (DRAM) devices and/or other similar memory devices. DRAM is a common type of memory that provides a relatively large amount of memory space and low power consumption but with relatively low bandwidth and high access latency relative to other types of memory.

Control circuitry within the computing system helps to conserve power consumed by the components of the computing system while, at the same time, maintaining an appropriate level of performance. To conserve power, components of the computing system transition between high and low power states in varying usage scenarios. When a particular component is in heavy use during execution of assigned work, the component is in a high-power state. When a particular component is in light use or not used at all during execution of the application program, the component is in a low power state in order to reduce power consumption.

Further, when in use, the components of the computing system often access system memory, such as to fetch instructions from system memory, load data from system memory, store data to system memory, and/or the like. Because multiple components can access the system memory, the limited bandwidth of the system memory can limit the overall performance of the system. In order to minimize the system memory bandwidth consumed by the components of the computing system, a shared cache that is accessible to all components can be placed between the interconnect and the system memory or, alternatively, within the interconnect itself. This type of shared cache is referred to herein as a system level cache (SLC) and typically includes a number of cache lines. In some embodiments, the SLC is implemented with static random access memory (SRAM) devices and/or other similar memory devices. SRAM is a common type of memory that provides a relatively small amount of memory space and higher power consumption but with relatively high bandwidth and short access latency relative to other types of memory. Including an SLC in the system can significantly reduce the number of memory operations directed towards the system memory, thereby increasing overall performance.

In addition, due to the higher bandwidth provided by the SLC, components can complete work faster, thereby allowing components to enter low power states more frequently and to stay in these low power states for longer periods of time. Further, when components access the SLC more frequently and thus access system memory less frequently, the DRAM devices can either operate at lower frequency or enter a low-power state during periods of time when the system memory is not accessed.

Because the SLC is a relatively small memory, data that is likely to be accessed in the near future is preferably maintained within the SLC. In prior art, control circuitry within the cache or associated with the cache implements one or more cache replacement policies to determine which lines to evict when new requests are made to the cache. Advantageously, the control logic evicts data that may have been accessed in the past but is not likely to be accessed in the near future. Cache replacement policies attempt to optimize performance of the SLC by reducing the cache miss rate.

Many cache replacement policies have been deployed. For example, a random replacement (RR) policy selects a cache line at random for eviction. While an RR policy requires no access history data and, therefore, is relatively simple to implement, an RR policy is not optimized for specific memory access patterns. Some cache replacement policies are based on access recency, including a first-in-first-out (FIFO) policy, a last-in-first-out (LIFO) policy, a least-recently-used (LRU) policy, and a most-recently-used (MRU) policy. Similarly, some cache replacement policies are based on access frequency, including a least-frequently-used (LFU) policy. Access recency policies and access frequency policies involve storing certain access history data for each cache line, such as the time of storage, the time of first access, the time of last access, frequency of access, and/or the like. Therefore, access recency policies and access frequency policies are more complex to implement than an RR policy, but are optimized for specific memory access patterns. Other cache replacement policies are based on storing, and using, access history data that helps to predict when cache lines are likely to be re-referenced. These cache replacement policies include re-reference interval prediction (RRIP), static re-reference interval prediction (SRRIP), bimodal re-reference interval prediction (BRRIP), and dynamic re-reference interval prediction (DRRIP). Re-reference prediction policies are also more complex to implement than an RR policy and exhibit different tradeoffs between hardware and software complexity versus miss rate, but again are optimized for specific memory access patterns.

One problem with conventional cache replacement policies in an SLC is that different components of the computing system can benefit from different cache replacement policies. In some use cases, a first component that is likely to reference data stored in cache memory before the data is evicted may benefit from allocating cache memory. However, a second component that is not likely to reference data stored in cache memory before the data is evicted may not need to allocate any cache memory. In such use cases, selecting a cache policy replacement policy that allocates cache memory for the first component could result in needlessly allocating cache memory for the second component, thereby degrading the benefit of the cache memory for other components. On the other hand, allocating no cache memory could be suitable for the second component, but would result in poor memory performance for the first component, as well as other components that could benefit from allocating cache memory.

Dynamic cache replacement policies, such as DRRIP can marginally improve cache utilization over static policies, but are not able to make bold allocation decisions that can dramatically improve cache performance in specific use cases and are unable to optimally handle cases such as streaming writes that are accessed once after an extended period. Furthermore, system state may change which caching decisions are optimal for a given set of client request streams. For example, when CPU and other clients are active, an optimal solution may be that video client request streams do not allocate in the cache, whereas in low-power use cases in which video clients are the only active clients, such clients may benefit from allocating in the cache in order to achieve power goals. Performance and power of the computing system can therefore suffer compared to what would be possible if caching behavior were better managed.

As the foregoing illustrates, what is needed in the art are more effective techniques for managing cache memory in a computing system, taking advantage of knowledge of system state and memory access patterns of clients.

SUMMARY

Various embodiments of the present disclosure set forth a computer-implemented method for managing cache memory in a computing system. The method includes monitoring telemetric data that measures a system state the computing system. The method further includes determining whether the system state is consistent with a previously identified system state included in a set of previously identified system states. The method further includes, if the system state is consistent with a first previously identified system state included in the set of previously identified system states, then: updating a mapping table with table entry indices appropriate for each combination of client type identifier and buffer type for the first previously identified system state, or if the system state is not consistent with any previously identified system state included in the set of previously identified system states, then: updating the mapping table with the table entry indices appropriate for each combination of client type identifier and buffer type for a default system state. The method further includes reading one or more cache control parameters from a table entry referenced by the table entry index.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, with the disclosed techniques, cache replacement policy management and cache partitions management are dynamically selected based on the memory access use case for various SLC clients. The techniques take both the current system state as well as client-provided (sub-stream) cacheability information into account. The techniques can concurrently achieve the benefits of multiple prior approaches, such as DRRIP approaches, state-based approaches, and client hint-based approaches. As with DRRIP approaches, the techniques can infer whether particular client streams can benefit from caching data or not. As with state-based approaches, the techniques can configure cache policy decisions based on the current system state. As with client hint-based approaches, the techniques can make different caching decisions for different types of requests from the same client. For example, the techniques can elect to not allocate cache memory for streaming data accesses from a client and allocate cache memory for data accesses from the same client that have a high likelihood of reuse. In this manner, the techniques can make optimal caching decisions for each client and access type, taking into account the current system state as well as client-provided sub-stream information. As a result, the techniques can result in improved cache memory utilization, performance, and power management relative to conventional approaches. In addition, the techniques are extendable, such that cache replacement policy management and cache partitions management can be applied for certain client types and data access types, and later expanded to be applied for other client types and data access types. Further, these techniques can be extended to recognize and optimize for additional use cases as those additional use cases are identified. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
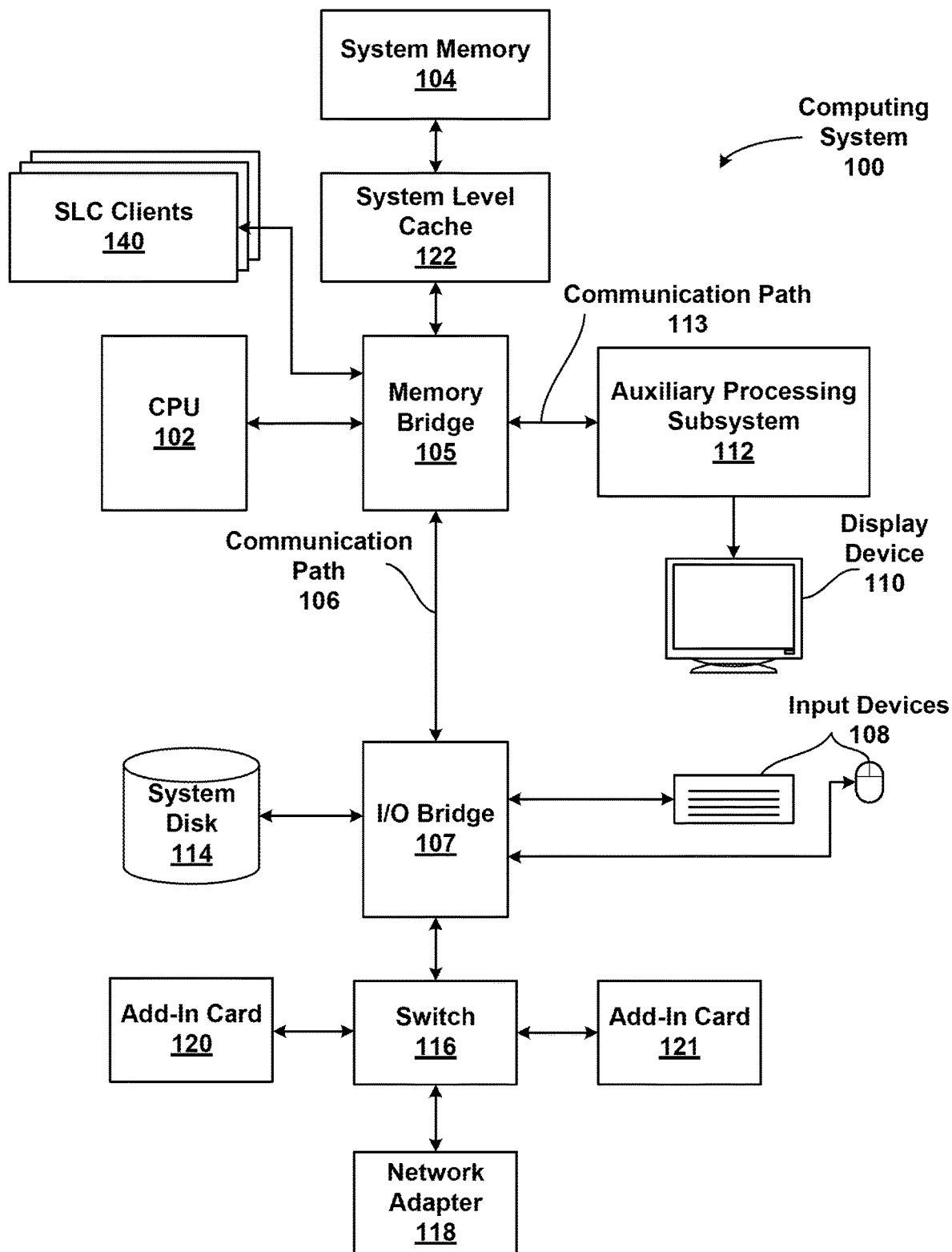
FIG. 1 is a block diagram of a computing system configured to implement one or more aspects of the various embodiments.

FIG. 1 is a block diagram of a computing system 100 configured to implement one or more aspects of the various embodiments. As shown, computing system 100 includes, without limitation, a central processing unit (CPU) 102, a system level cache (SLC) 122, other SLC clients 140, and a system memory 104 coupled to an auxiliary processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116. CPU 102 is coupled to memory bridge 105, enabling the other SLC clients 140 to communicate with other SLC clients 140, system level cache 122, system memory 104, auxiliary processing subsystem 112, and I/O bridge 107. Other SLC clients 140 are also coupled to memory bridge 105, enabling the other SLC clients 140 to communicate with CPU 102, system level cache 122, system memory 104, auxiliary processing subsystem 112, and I/O bridge 107.

In operation, I/O bridge 107 is configured to receive user input information from input devices 108, such as a keyboard or a mouse, and forward the input information to CPU 102 for processing via communication path 106 and memory bridge 105. In some embodiments, input devices 108 are employed to verify the identities of one or more users in order to permit access of computing system 100 to authorized users and deny access of computing system 100 to unauthorized users. Switch 116 is configured to provide connections between I/O bridge 107 and other components of the computing system 100, such as a network adapter 118 and various add-in cards 120 and 121.

As also shown, I/O bridge 107 is coupled to a system disk 114 that may be configured to store content and applications and data for use by CPU 102 and auxiliary processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid-state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computing system 100, may be implemented using any technically suitable protocols, including, without limitation, Peripheral Component Interconnect Express (PCIe), HyperTransport, or any other bus or point-to-point communication protocol known in the art.

In some embodiments, auxiliary processing subsystem 112 comprises a graphics subsystem that delivers pixels to a display device 110 that may be any conventional cathode ray tube, liquid crystal display, light-emitting diode display, or the like. In such embodiments, the auxiliary processing subsystem 112 incorporates circuitry optimized for graphics and video processing, including, for example, video output circuitry. Such circuitry may be incorporated across one or more auxiliary processors included within auxiliary processing subsystem 112. An auxiliary processor includes any one or more processing units that can execute instructions such as a central processing unit (CPU), a parallel processing unit (PPU), a graphics processing unit (GPU), a direct memory access (DMA) unit, an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, the auxiliary processing subsystem 112 incorporates circuitry optimized for general purpose and/or compute processing. Again, such circuitry may be incorporated across one or more auxiliary processors included within auxiliary processing subsystem 112 that are configured to perform such general purpose and/or compute operations. In yet other embodiments, the one or more auxiliary processors included within auxiliary processing subsystem 112 may be configured to perform graphics processing, general purpose processing, and compute processing operations.

System level cache 122 is a last-level-cache. System level cache 122 can maintain hardware coherency between various coherent SLC clients in computing system 100, including CPU 102, auxiliary processing subsystem 112, network adapter 118, and/or the like. System level cache 122 exhibits low access latency relative to system memory 104. System level cache 122 acts as a point of serialization, in that traffic between various SLC clients and system memory 104 passes through system level cache 122. System level cache is managed by an SLC policy manager (not shown in FIG. 1) as described in conjunction with FIGS. 2-4. The SLC policy manager is also referred to herein as a cache memory policy manager.

In various embodiments, auxiliary processing subsystem 112 may be integrated with one or more other the other elements of FIG. 1 to form a single system. For example, auxiliary processing subsystem 112 may be integrated with CPU 102, memory bridge 105, I/O bridge 107, and/or other components and connection circuitry on a single chip to form a system on chip (SoC). Additionally or alternatively, these various components can be integrated together on multiple chips in the form of chiplets and/or dielets. As referred to herein, chiplets and dielets are small integrated circuits, where each chiplet and dielet performs a defined set of functions. Multiple chiplets and dielets can be combined together to form a multi-chip module or hybrid integrated circuit that performs higher level functions. For example, multiple chiplets and dielets can be combined together to form computing system 100. Interconnect circuitry on the SoC, chiplets, and/or dielets, facilitates communication among the various components, including CPUs, GPUs, auxiliary processors, video and/or audio streaming devices, network adapters, and/or the like.

It will be appreciated that the system shown herein is illustrative and that variations and modifications are possible. The connection topology, including the number and arrangement of bridges, the number of CPUs 102, and the number of auxiliary processing subsystems 112, may be modified as desired. In alternative topologies, auxiliary processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Managing a System Level Cache Memory with Multiple Cache Clients

Various embodiments include an SLC policy manager that employs hardware-based techniques and software-based techniques for managing cache memory in a computing system. The disclosed techniques dynamically detect various memory access use cases and select cache replacement policies that are well suited for the detected use case. To aid in detecting memory access use cases and selecting cache replacement policies, components of the computing system are designated by and identified with an allocation/replacement identifier (ARID) value. Components of the computing system that access the system level cache are referred to herein as SLC clients. In some embodiments, a unique ARID can be assigned to each individual SLC client. Alternatively, a class of SLC clients that have similar allocation and/or replacement policies, that share the same SLC residence properties, and/or that exhibit the same or similar memory access patterns, can share the same ARID value. The tag data for each cache line stored in the SLC is tagged with the ARID of the SLC client that caused the corresponding cache line to be stored in the SLC. The disclosed techniques include client caching hints, a programmable mapping table, cache policy controls, and SLC policy manager (SLCPM) software.

Figure 2:
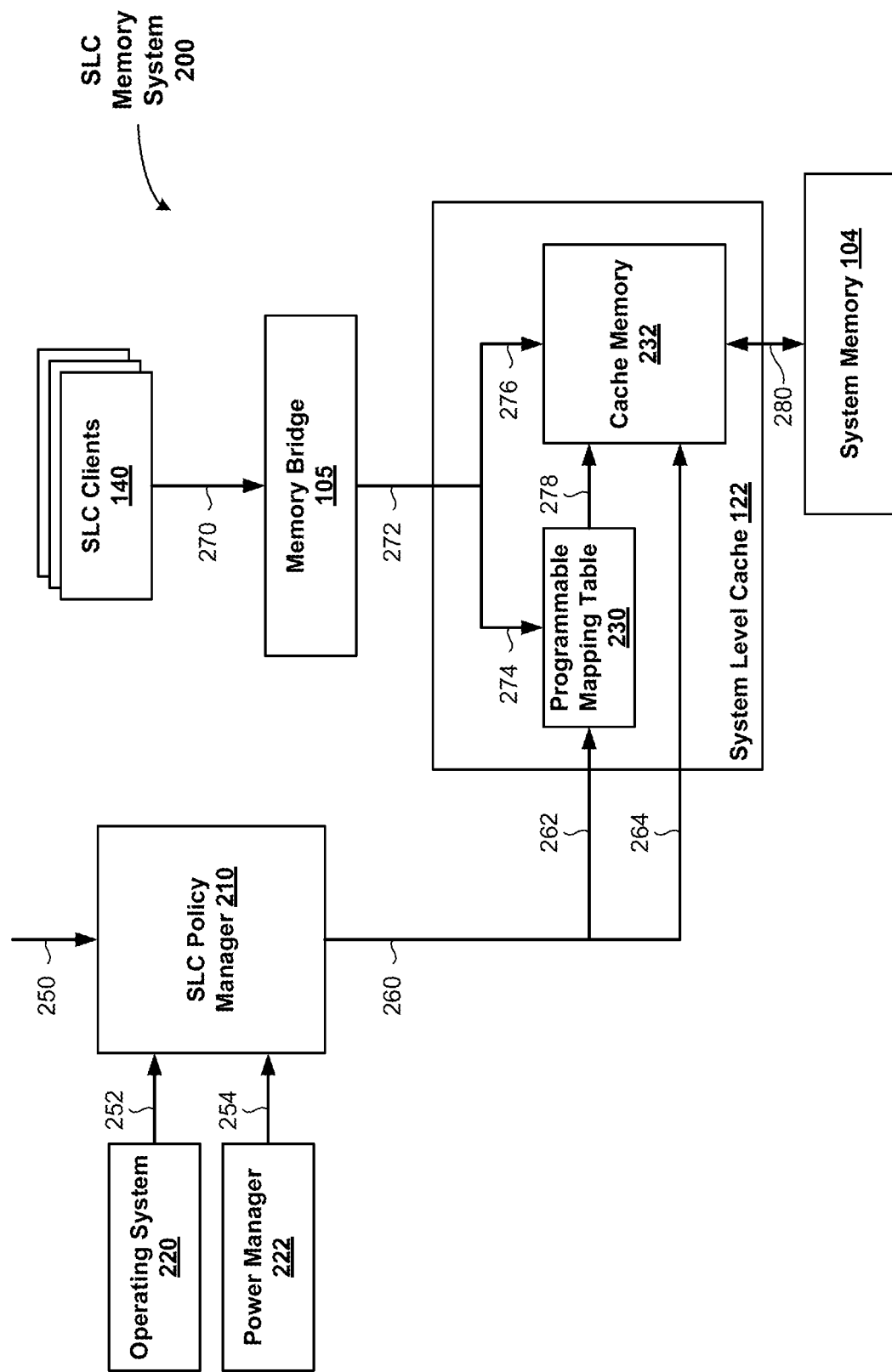
FIG. 2 is a block diagram of an SLC memory system included in the computing system of FIG. 1, according to various embodiments.

FIG. 2 is a block diagram of an SLC memory system 200 included in the computing system 100 of FIG. 1, according to various embodiments. As shown, the SLC memory system 200 includes, without limitation, an SLC policy manager 210, an operating system 220, a power manager 222, as well as the system level cache 122 and system memory 104 of FIG. 1. SLC clients 140 communicate with the SLC memory system 200 via a system interconnect, such as the memory bridge 105 of FIG. 1. The system level cache 122 includes a programmable mapping table 230 and a cache memory 232. In some embodiments, the programmable mapping table 230 is a single mapping table included in the SLC memory system 200. In some embodiments, the programmable mapping table 230 includes multiple mapping tables that are distributed among one or more SLC memory systems 200.

SLC clients 140 generate memory requests according to the requirements of the application(s) supported by the SLC clients 140. The configurations of a given SLC client 140 and the stream of memory requests generated by the given SLC client 140 are based on one or more applications executed by the SLC client 140. The configuration and the stream of memory requests are generally independent of the overall system state. In some examples, a video application that includes a video decode engine decoding a motion picture experts group (MPEG) stream can behave the same, whether the video application is the only executing application or whether a CPU-heavy application is executing concurrently. With each memory request, an SLC client 140 generates and transmits a BufferType hint, which encodes information about the memory request pattern for that stream. In some examples, the BufferType hint can identify a category of the memory request, such as whether memory addresses associated with the memory requests are likely to be re-referenced once, many times, or not at all. An SLC client 140 can simultaneously generate memory request streams with different memory access patterns, where each memory request stream is tagged with a corresponding BufferType value. The SLC client 140 further generated an ARID that identifies the type of SLC client 140. Each SLC client 140 that allocates cache lines in the system level cache 122 is assigned an appropriate ARID by the SLC memory system 200. Memory requests generated by that SLC client 140 are tagged with the ARID corresponding to that SLC client 140.

The memory bridge 105, or other system interconnect, routes memory requests 270 from SLC clients 140 to the system level cache 122, while arbitrating among memory request streams from the various SLC clients 140. The memory bridge 105 preserves the attributes associated with each memory request. These attributes include the BufferType value, the ARID, and/or the like. The memory bridge 105 transmits routed memory requests 272 to the system level cache 122.

Concurrently, the SLC policy manager 210 executes as a background process, receiving use case data 252 from the operating system 220, system power state 254 from the power manager 222, and/or the like. In some embodiments, the SLC policy manager can further receive activity data 250 from SLC clients 140, from system monitors, and/or the like. The SLC policy manager 210 can execute on the CPU 102, on the auxiliary processing subsystem 112, on an auxiliary processor, on an FPGA, on a microcoded processor, and/or the like. The SLC policy manager 210 determines the system state and, based on the current system state, transmits configuration commands over a configuration interface 260. In some embodiments, the configuration interface 260 includes a standard register programming interface, a communications bus included in the computer system 100, and/or the like. When the SLC policy manager 210 determines that the system state has changed, the SLC policy manager 210 transmits updates 262 to the programmable mapping table 230 that are appropriate for the newly determined system state. The SLC policy manager 210 can also update global cache control parameters 264, as appropriate for the newly determined system state. Global cache control parameters 264 include parameters that apply to all SLC clients 140, such as cache partitioning data.

When a routed memory request 272 arrives at the system level cache 122, a PMT subsystem (not shown) included in the SLC memory system 200 generates a PMT entry index by concatenating the ARID and BufferType information together to form an index 274 into the programmable mapping table 230. This PMT subsystem is referred to as a mapping table controller. The programmable mapping table 230 selects appropriate cache control parameters 278 for the memory request 276, which can include cache allocation parameters, cache replacement parameters, cache eviction parameters, and/or the like. The cache control parameters 278 determine whether the memory request 276 is allocated at the cache memory 232 and how cache line attributes are set. Memory requests 276 that cannot be satisfied within the cache memory 232 are transmitted via path 280 to the system memory 104 as read operations or write operations.

A system level cache memory controller (not shown) associated with the system level cache 122 employs the concatenation of ClientID and BufferType as the index into the programmable mapping table 230. In some embodiments, storing a complete set of cache control parameters 278 in each table entry of the programmable mapping table 230, can result in a programmable mapping table 230 that is impractically large. Accordingly, in some embodiments, the size of the programmable mapping table 230 can be reduced by mapping ClientIDs into a smaller set of ARIDs, where each ARID represents a subset of SLC clients 140 that have similar memory access patterns with one another. In such embodiments, the concatenation of ARID and BufferType is smaller, and the size of the programmable mapping table 230 can be reduced. In some embodiments, the programmable mapping table 230 includes indices, rather than explicit cache control parameters 278. The indices refer to a limited set of allocation classes, where each allocation class is associated with a particular set of cache control parameters 278. In some embodiments, the number of indices is 16, such that each table entry in the programmable mapping table 230 includes only 4 bits, where the 4 bits identify the index to one of the 16 sets of cache control parameters 278. In this manner, each entry of the programmable mapping table 230 does not need to store the dozens or hundreds of bits needed to explicitly store a full set of cache control parameters 278. The index stored in the table entries of the programmable mapping table 230 refers to a corresponding table entry in a table of actual cache control parameters 278. Such embodiments can implement the {ClientID, BufferType} mapping to cache control parameters 278 in a more efficient way.

In further detail, the SLC memory system 200 employs at least four techniques to manage the system level cache 122. These techniques include client caching hints, a programmable mapping table 230, cache policy controls, and an SLC policy manager 210.

A first technique, referred to as client caching hints, is a hardware-based technique where each SLC client indicates a memory access pattern associated with the SLC client. More specifically, SLC clients indicate a buffer type along with the corresponding memory access request. The buffer type distinguishes different types of buffers used by the SLC clients that can benefit from different cache allocation policies. For example, one buffer type can identify buffers containing weight parameters that are read from memory multiple times but rarely, if ever, written to memory. A second buffer type can identify buffers containing source data that is streamed into the processor once and then discarded. A third buffer type can identify buffers that are written to memory once, and so on. The buffer type does not directly indicate what the cache allocation and replacement policy should be. Instead, the buffer type provides information about the data use by a particular SLC client that can be used in determining an appropriate allocation and replacement policy for that data in a particular use case. In some embodiments, SLC clients can include a buffer type index along with the corresponding memory access request. The buffer type index is a small numeric tag that the SLC client attaches as an attribute to each memory access request. The buffer type index encodes the buffer type into a small multibit value, such that each different buffer type corresponds to a different buffer type index.

A second technique is a hardware-based technique that employs a programmable mapping table (PMT). The programmable mapping table maps the ARID and the buffer type to the allocation and replacement controls of the SLC. A PMT subsystem included in the SLC memory system 200 generates a PMT entry index by concatenating the ARID and buffer type values together to form a {ARID, BufferType} vector. A system level cache memory controller employs the {ARID, BufferType} vector as an index into the programmable mapping table. Each entry in the programmable mapping table includes cache allocation and replacement parameters for memory requests from the specific SLC client that employs the specified buffer type. The entries in the programmable mapping table are programmable so that the entries can be updated for each given use case. The cache allocation and replacement parameters determine whether and how data associated with memory requests is allocated in the SLC and criteria for when cache lines in the SLC are replaced.

In some embodiments, the number of SLC clients, buffer types, and cache parameters, such as allocation and replacement policy controls, can be substantially large. Correspondingly, the size of the PMT can be substantially large, both in the number of table entries and in the data width of the table entries. In such embodiments, the overall size of the PMT can be reduced by dividing the PMT into two smaller tables. A first table maps the {ARID, BufferType} vector to a PMT index. A second table maps the PMT index to a set of cache parameters. The entries in the second PMT table include distinct allocation and replacement policy controls, along with other cache parameters, that are useful in the computing system 100. This approach effectively vector quantizes and compresses the memory space consumed by PMT table entries. The combined size of these two tables can be significantly less that a single PMT that is directly indexed by the {ARID, BufferType} vector.

A third technique, referred to as cache policy controls, is a hardware-based technique where the SLC implements one or more allocation and replacement controls that are applied to incoming requests, as determined by the relevant PMT table entry.

One allocation and replacement control, referred to as cache line allocation, defines where in the LRU chain a particular memory request is allocated. The memory request can allocate in different eviction classes, which can provide isolation and/or protection during victim selection, where a victim is a cache line that is selected for eviction.

Another allocation and replacement control, referred to as cache line promotion, promotes a cache line when the cache line is hit. The hit cache line can get promoted to the MRU position, to the next level position in the LRU chain, to the LFU position, and/or the like. Further, the promotion technique can vary based on the SLC client that caused the cache line hit. In some embodiments, when CPU 102 causes a cache line hit, the cache line may be promoted to the MRU position, whereas when auxiliary processing subsystem 112 causes a cache line hit, the cache line may be promoted to the LFU position. This approach can be advantageous for use cases where memory accesses by auxiliary processing subsystem 112 are of higher frequency relative to memory accesses by CPU 102.

Yet another allocation and replacement control, referred to as cache line demotion, demotes a cache line under certain conditions. For example, caching hints from the client can indicate that a current memory request is the last use of the associated memory address by the client. Such a caching hint can indicate that the corresponding cache line is no longer needed and, therefore, can be evicted from the cache memory.

Yet another allocation and replacement control, referred to as cache line victimization, places newly allocated cache lines resulting from memory requests in different victim tiers. These victim tiers can serve as the last level of arbitration during victim selection.

Yet another allocation and replacement control is a replacement code that indicates the likelihood of a cache line being re-referenced. The replacement code can indicate whether a cache line is most likely to be re-referenced, more likely to be re-referenced, somewhat likely to be re-referenced, least likely to be re-referenced, and/or the like. Additionally or alternatively, the replacement code can indicate that there is no recommendation, in which case a default re-reference likelihood is selected.

Yet another allocation and replacement control is a read/write indicator for cases where the cache policy can differ for read operations versus write operations. Yet another allocation and replacement control is an eviction class code that indicates whether the cache line should be evicted with high priority, medium priority, or low priority.

Yet another allocation and replacement control is a decay interval that sets a time period for demoting a cache line to a lower eviction class, or for evicting a cache line. In that regard, in some embodiments, each cache line is provided with a decay counter. Further, some embodiments can provide a decay counter for a collection of cache lines or other mechanism to track the aging of memory requests. In such embodiments, if the cache line is re-referenced during the decay interval, then the decay counter is reset to the initial value. If the cache line is re-referenced during the decay interval, then the decay counter is reset to the initial value. If the cache line is not re-referenced during the decay interval, then the decay counter is decremented, the cache line is demoted to a lower eviction class, the cache line is evicted from the system level cache, and/or the like.

The cache allocation and replacement parameters can further include any other data that can improve the caching behavior for requests from a given client with a given buffer type. Other embodiments could implement allocation and replacement controls in different variations and in different combinations. For example, some embodiments could index certain allocation and replacement controls into the programmable mapping table by ARID and buffer type {ARID, BufferType}, while other embodiments could index certain allocation and replacement controls into the programmable mapping table only by ARID {ARID}.

A fourth technique, referred to as SLC policy manager (SLCPM), is a technique where a software or firmware program referred to as an SLC policy manager monitors system state, detects and infers the memory access use case, and dynamically updates the programmable mapping table to optimize the use of the SLC.

The SLC policy manager controls the mapping of each {ARID, BufferType} vector to a corresponding PMT entry. The SLC policy manager controls this mapping, thereby controlling which memory buffers are allocated in the system level cache and the priority for replacement for each of the memory buffers stored in the system level cache. The SLC policy manager can reprogram the mapping in the PMT based on a detected use case and/or scenario, where the detected scenario is based on the power state for various SLC clients, the activity level of various SLC clients, and/or the like. The SLC policy manager receives the data for detecting scenarios from the operating system, hardware components, and/or the like. Based on the detected scenario, SLC policy manager updates mappings in the table entries in the PMT to tune the system level cache operation for the detected scenario. The table entries in the PMT define the combination of various cache policies. The table entries in the PMT can effect changes to the cache policies based on detected scenarios, system requirements, and/or the like. In this manner, the SLC policy manager updates the SLC allocation and replacement policy controls in the PMT to adapt caching behavior of the system level cache for different scenarios.

Figure 3:
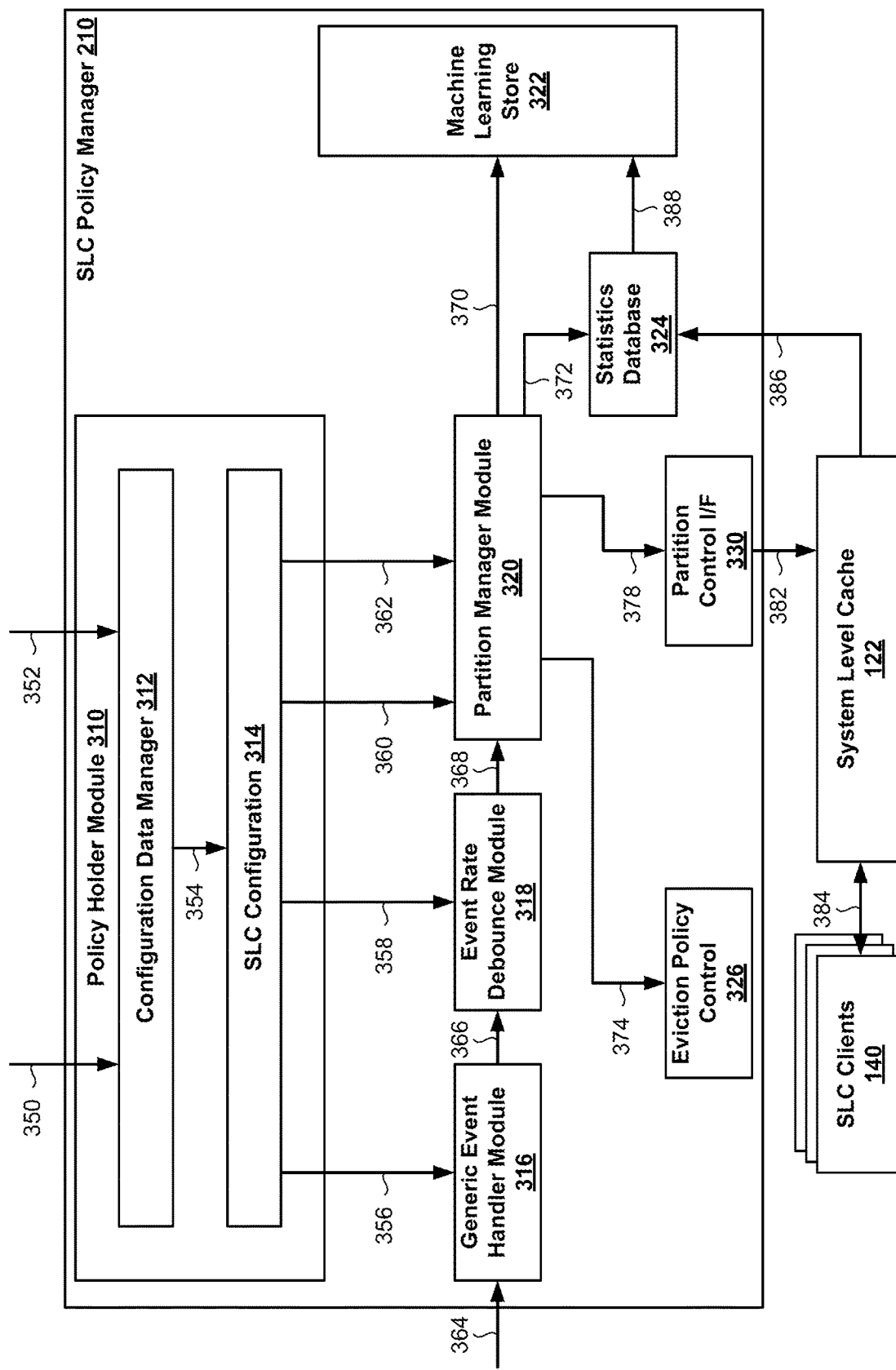
FIG. 3 is a block diagram of the SLC policy manager for the SLC memory system of FIG. 2, according to various embodiments.

FIG. 3 is a block diagram of the SLC policy manager 210 for the SLC memory system 200 of FIG. 2, according to various embodiments. The SLC policy manager 210 includes, without limitation, a policy holder module 310, a generic event handler module 316, an event rate debounce module 318, a partition manager module 320, a machine learning store 322, a statistics database 324, an eviction policy control 326, and a partition control interface (I/F) 330. Policy holder module 310, in turn, includes, without limitation, a configuration data manager 312 and an SLC configuration 314. The components of SLC policy manager 210 can be implemented with hardware components, firmware components, or software components, in any combination.

SLC policy manager 210 monitors the state of individual SLC clients 140, system activity of computing system 100, and the power state of individual SLC clients 140. Further, SLC policy manager 210 can receive information about the state of the operating system and about the applications executing on the various SLC clients 140. In so doing, SLC policy manager 210 monitors system events 364 including system related events and/or power related events delivered in the form of interrupts, event messages, and/or the like. System events 364 represent telemetric data that measures various components of computing system 100. SLC policy manager 210 monitors this telemetric data. Based on this telemetric data, SLC policy manager 210 detects known, also referred to herein as previously identified, use cases and/or scenarios that can be optimized for efficient access to SLC 122. These known scenarios can include video streaming, audio streaming, audiovisual conferencing, intensive computation, and/or the like. After detecting a current scenario, SLC policy manager 210 selects one or more corresponding scenario-based actions that modify one or more cache control parameters. SLC policy manager 210 performs the actions, resulting in a cache state of SLC 122 that is tuned for the detected scenario, including a high cache hit rate, a low eviction rate, and/or the like. If SLC policy manager 210 does not identify a specific scenario, then SLC policy manager 210 applies a generic or default setting that best maximizes performance in a particular default scenario across a range of scenarios. In some embodiments, the default scenario is a high-performance, high-power scenario. High-performance, high-power use cases can be difficult to identify and/or categorize and, therefore, can be good candidates for the default scenario. Further, if SLC policy manager 210 cannot identify a specific scenario that is tuned for a particular use case, then selecting a high-performance, high-power scenario as a default scenario does not unfairly penalize the SLC client 140. More generally, if SLC policy manager 210 identifies a specific scenario, then SLC policy manager 210 selects a PMT entry that is optimized for the previously identified system state associated with the specific scenario. If SLC policy manager 210 does not identify a specific scenario, then SLC policy manager 210 selects a PMT entry specifies a default behavior that is compatible with, but not optimized for, the previously identified system state associated with the specific scenario.

Policy holder module 310 receives cache policy initial parameters 350 and runtime updates 352 and stores the initial parameters 350 and runtime updates 352 for other components of SLC policy manager 210.

Configuration data manager 312 receives initial parameters 350 and accepts runtime updates 352 to the parameters during operation. Configuration data manager 312 parses and categorizes initial parameters 350 and runtime updates 352. After parsing and categorizing, configuration data manager 312 stores the processed data in SLC configuration 314. If configuration data manager 312 modifies data in SLC configuration 314, then configuration data manager 312 generates one or more notifications of the modification and transmits the notifications to relevant components of SLC policy manager 210.

At initial startup, SLC 122 is fully shared by the SLC clients 140 via path 384. Policy holder module 310 can modify the initial startup configuration by receiving initial parameters 350, parsing and categorizing the initial parameters 350, and storing the resulting configuration data 354 in SLC configuration 314. SLC configuration 314 transmits the configuration data to relevant components of SLC policy manager 210. In that regard, SLC configuration 314 transmits broadcast updates 356 to generic event handler module 316, broadcast updates 358 to event rate debounce module 318, and broadcast updates 360 and 362 to partition manager module 320. The components of SLC policy manager 210 begin execution using the configuration data in SLC configuration 314.

Over time, policy holder module 310 can modify the current configuration by receiving runtime updates 352, parsing and categorizing the runtime updates 352, and storing the resulting updated configuration data in SLC configuration 314. SLC configuration 314 transmits the updated configuration data to relevant components of SLC policy manager 210. In that regard, SLC configuration 314 transmits broadcast updates 356 to generic event handler module 316, broadcast updates 358 to event rate debounce module 318, and broadcast updates 360 and 362 to partition manager module 320. The components of SLC policy manager 210 continue execution using the updated configuration data in SLC configuration 314.

Data received as the initial parameters 350 and runtime updates 352 include: debouncing timer intervals, hardware partitioning information, partition size and/or partition granule size information, hit and/or miss rate per SLC client 140, percentage of SLC 122 dedicated to each traffic class when multiple traffic classes are active, information regarding which SLC clients 140 are members of each traffic class, victim/eviction selection strategy, beneficiary selection strategy, streaming detection enablement, information identifying the partitioning technique being used, and/or the like. In some embodiments, the partition size can be expressed as a number of granules, and the partition size can change in multiples of granules. The granule size can be either determined by hardware and/or by software that modifies the granule size set by hardware.

Generic event handler module 316 receives system events 364 that are relevant to system level cache management and transmits the system events 364 to event rate debounce module 318. Generic event handler module 316 further receives broadcast updates 356 from SLC configuration 314. Based on policy parameter settings received via broadcast updates 356, generic event handler module 316 selects certain system events 364 to transmit to event rate debounce module 318 and suppresses other system events 364 from being transmitted. Certain system events 364, such as power state change of SLC clients 140, are relevant for SLC management and, therefore, would be transmitted by generic event handler module 316. Other system events 364, such as certain activity measures, may or may not be relevant for SLC management and, therefore, could be transmitted or suppressed by generic event handler module 316, depending on SLC configuration 314. Generic event handler module 316 transmits filtered system events 366 to event rate debounce module 318.

Event rate debounce module 318 receives filtered system events 366 from generic event handler module 316 and broadcast updates from SLC configuration 314. Event rate debounce module 318 stabilizes the state of SLC 122, such as when an SLC client 140 has become unstable and generates a high rate of system events 364. In some embodiments, rapid state changes of an SLC client 140 can cause a flood of cache allocations and cache evictions, resulting in effective cancelation of the benefits of cache management strategies, such as cache partition size optimization. Event rate debounce module 318 protects SLC 122 from excessive cache misses and cache evictions caused by frequent changes regarding which segments belong to which partitions. Event rate debounce module 318 can perform global debouncing for all SLC clients 140 or specific debouncing per each SLC client 140, in any combination. Event rate debounce module 318 receives a debouncing timer interval (DTI) from SLC configuration that defines a minimum time interval before a consecutive SLC client state change would generate a partition allocation state change. Setting the DTI to zero disables the debouncing function. Event rate debounce module 318 transmits debounced system events 368 to partition manager module 320.

Partition manager module 320 receives debounced system events 368 from event rate debounce module 318 and broadcast updates 360 and 362 from SLC configuration. Partition manager module 320 manages SLC 122 partition sizes based on the debounced system events 368 and the applied policy as received from SLC configuration 314 via broadcast updates 360 and 362. Partition manager module 320 is described in conjunction with FIG. 4. Briefly, partition manager module 320 can modify the cache control parameters by changing a partition boundary. Changing the partition boundary increases an amount of system level cache memory allocated to a first system level cache partition and decreases an amount of system level cache memory allocated to a second system level cache partition. In some embodiments, the first system level cache partition and/or the second system level cache partition can be allocated to a subset of two or more SLC clients 140.

Further, partition manager module 320 tunes eviction policy parameters 374 and transmits the eviction policy parameters 374 to eviction policy control 326. Partition manager module 320 generates cache partition data 378 and transmits the cache partition data 378 to partition control interface 330. Partition manager module 320 generates partition training data 370 and transmits the partition training data 370 to machine learning store 322. Partition manager module 320 generates statistical data 372 and transmits the statistical data 372 to statistics database 324.

Eviction policy control 326 receives eviction policy parameters 374 from partition manager module 320. Eviction policy control 326 dynamically changes eviction policy of SLC 122 over time in response to updated eviction policy parameters 374 received from partition manager module 320.

Partition control interface 330 receives cache partition data 378 from partition manager module 320. Partition control interface 330 dynamically changes the partition boundaries 382 of SLC 122 over time in response to updated cache partition data 378 received from partition manager module 320. Partition control interface 330 transmits the updated partition boundaries 382 to SLC 122.

Statistics database 324 receives statistical data 372 from partition manager module 320 and receives hit/miss data 386 from SLC 122. Statistics database 324 stores statistical data 372 and hit/miss data 386 for subsequent analysis to determine the efficiency and effectiveness of SLC policy manager 210. Further, statistics database 324 transmits statistical training data 388 to machine learning store 322.

Figure 4:
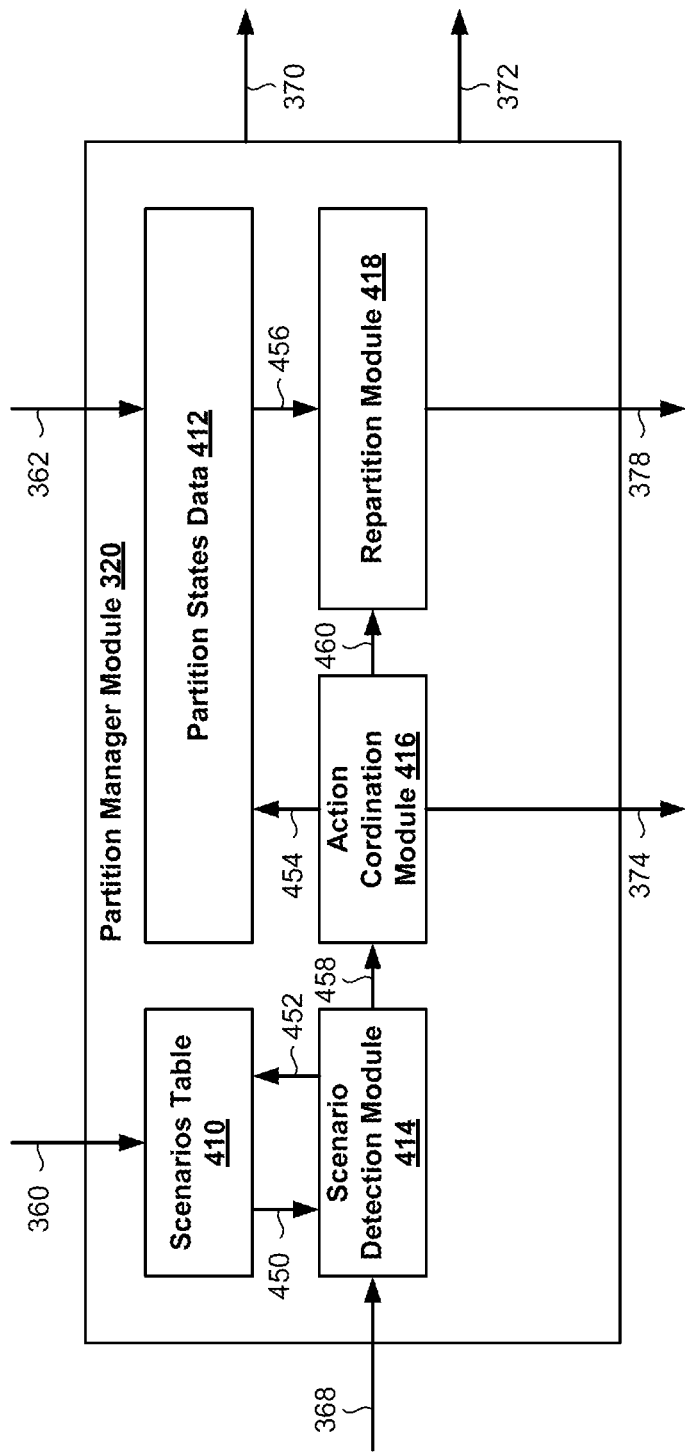
FIG. 4 is a block diagram of the partition manager module included in the SLC policy manager of FIG. 3, according to various embodiments.

Machine learning store 322 receives partition training data 370 from partition manager module 320 and receives statistical training data 388 from statistics database 324. Machine learning store 322 stores partition training data 370 and statistical data 372 for subsequent training of a machine learning model to perform one or more of the techniques described herein FIG. 4 is a block diagram of the partition manager module 320 included in the SLC policy manager 210 of FIG. 3, according to various embodiments. The partition manager module 320 includes, without limitation, a scenarios table 410, partition states data 412, a scenario detection module 414, an action coordination module 416, and a repartition module 418. The components of partition manager module 320 can be implemented with hardware components, firmware components, or software components, in any combination.

Scenarios table 410 receives parameters via broadcast updates 360 from SLC configuration 314. Scenarios table 410 formats these parameters and stores the parameters received via broadcast updates 360. In addition, scenarios table 410 receives parameter updates 452 from scenario detection module 414 and updates the parameters stored in scenarios table 410 accordingly. The parameters are stored in scenarios table 410 in the form of a programmable mapping table, described herein.

Partition states data 412 receives parameters via broadcast updates 362 from SLC configuration 314. Partition states data 412 stores the parameters received via broadcast updates 362. In addition, partition states data 412 receives parameter updates 454 from action coordination module 416 and updates the parameters stored in scenarios table 410 accordingly.

Scenario detection module 414 receives debounced system events 368 from event rate debounce module 318. Scenario detection module 414 coalesces debounced system events 368 in order to detect low power scenarios for one or more SLC clients 140, in any combination. Scenarios table 410 includes a set of known scenarios for which the cache memory behavior can be optimized. Scenario detection module 414 accesses scenarios table 410 via path 450 to determine whether the current system state matches any of the scenarios included in scenarios table 410. If scenario detection module 414 determines that the current system state matches a scenario included in scenarios table 410, then scenario detection module 414 determines corresponding action requests 458 based on the scenario. Scenario detection module 414 transmits the action requests 458 to action coordination module 416. If a particular detected low power scenario closely matches a single table entry in scenarios table 410, then scenario detection module 414 transmits the action requests 458 indicated by the table entry. If a particular detected low power scenario closely matches multiple table entries in scenarios table 410, then scenario detection module 414 generates a hybrid action request 458 based on a combination of the multiple table entries that closely match the detected low power scenario. In addition, scenario detection module 414 generates parameter updates 452 and transmits the parameter updates 452 to scenarios table 410.

In some embodiments, when scenario detection module 414 receives a series of filtered and debounced system events 368 from event rate debounce module 318, scenario detection module 414 has data on the state of each SLC client 140. The state of each SLC client 140 can be represented as a bit mask. Scenario detection module 414 can use the bit mask as a direct key into a hash table of states included in scenarios table 410 in order to detect an exact scenario. If scenario detection module 414 finds a single table entry from the direct key, then scenario detection module 414 determines that the table entry is correct. If scenario detection module 414 does not find a matching table entry from the direct key, then scenario detection module 414 performs a second order search to detect a combination of two or more table entries that, when combined, correspond to a table entry that represents a similar scenario to the current state. If scenario detection module 414 detects such a second order combination, then scenario detection module 414 performs a triage operation to determine a set of actions based on the multiple table entries that formed the combination. Scenario detection module 414 transmits the set of actions as action requests 458 to action coordination module 416.

Action coordination module 416 receives action requests 458 from scenario detection module 414. Based on these action requests 458, action coordination module 416 generates two types of actions. The first type of action is an action to adjust eviction policy parameters 374. Action coordination module 416 tunes these eviction policy parameters 374 and transmits the eviction policy parameters 374 to eviction policy control 326. The second type of action is an action to adjust partition parameters. Action coordination module 416 generates partition adjustments 460 and transmits the partition adjustments 460 to repartition module 418. In addition, action coordination module 416 generates parameter updates 454 and transmits the parameter updates 454 to partition states data 412.

Repartition module 418 receives partition adjustments 460 from action coordination module 416 and receives partition parameters 456 from SLC configuration 314. Repartition module 418 maintains the partition states of the SLC 122 and implements access to various partitioning techniques, such as partitioning by cache ways, partitioning by the available cache percentage, and/or the like.

In some embodiments, if one or more SLC clients 140 are active, repartition module 418 partitions SLC 122 such that the entire SLC 122 is allocated for use by the active SLC clients 140. If another SLC client 140 subsequently exits a low power state and changes to an active state, then repartition module 418 reduces the partition sizes of the other active SLC clients 140 in order to free memory space in SLC 122 for the newly active SLC client 140. If an SLC client 140 subsequently exits an active state and changes to a low power state, then repartition module 418 increases the partition sizes of the remaining active SLC clients 140 in order to make use of the memory space in SLC 122 for the SLC client 140 that entered the low power state.

In some embodiments, repartition module 418 organizes SLC clients 140 into traffic classes. In some systems, the number of SLC clients 140 can number in the dozens or hundreds. Rather than generating a partition for each individual SLC client 140, repartition module 418 can generate a partition for each group of SLC clients 140, where each group of SLC clients 140 represents a different traffic class. For example, all CPUs 102 could be members of a single CPU traffic class. Additionally or alternatively, the CPUs 102 could be organized into a small number of traffic classes, where each CPU traffic class includes a different subset of the total number of CPUs 102. In one particular example, repartition module 418 could organize SLC clients 140 into two traffic classes, a first traffic class that includes all CPUs 102 and a second traffic class that includes all other SLC clients 140. Over time, repartition module 418 the partition boundary between the partitions for these two traffic groups as needed.

In some embodiments, repartition module 418 operates with certain allocation restrictions. In that regard, repartition module 418 could define a minimum allocation, which is the allocation value that every SLC client 140 is guaranteed to have when active. Repartition module 418 could further establish an initial allocation that defines the SLC size percentage value dedicated to each SLC client 140 traffic class at initialization. Repartition module 418 could define the initial allocation to be identical to the minimum allocation. Repartition module 418 could further establish a delta allocation that represents a portion of an SLC partition that is above the initial allocation when all SLC clients 140 were considered to be active.

In some embodiments, SLC policy manager 210 triggers updates in all affected modules of SLC policy manager 210 concurrently. SLC policy manager 210 can effect this concurrent update via double buffering the memory in SLC configuration 314. With double buffering, once configuration data manager 312 has stored all of the new cache policy data ready at initial parameters 350 and/or runtime updates 352 in a secondary buffer of SLC configuration 314, configuration data manager 312 swaps the secondary buffer with the primary buffer of SLC configuration 314. As a result, the former secondary buffer with the new cache policy data is now accessed as the primary buffer. The former primary buffer with the previous cache policy data is now accessed as the secondary buffer to collect a subsequent set of cache policy data. Configuration data manager 312 generates broadcast updates 356, 358, 360, and 362 to notify other modules in SLC policy manager 210 of the buffer swap. In so doing, configuration data manager 312 does not reset the state of the cache policy data to the initial configuration. Instead, configuration data manager 312 stores the new cache policy data over the old cache policy data. In addition, cache line content is preserved until evictions naturally occur.

In some embodiments, changes of SLC partition sizes are stateless, such that preceding history of partition sizes do not affect a subsequent distribution of partition sizes. As a result, for a given list of active SLC clients 140, the steady state of SLC policy manager 210 typically achieves the same partition size percentages repeatedly whenever the same policy is reapplied.

Figure 5:
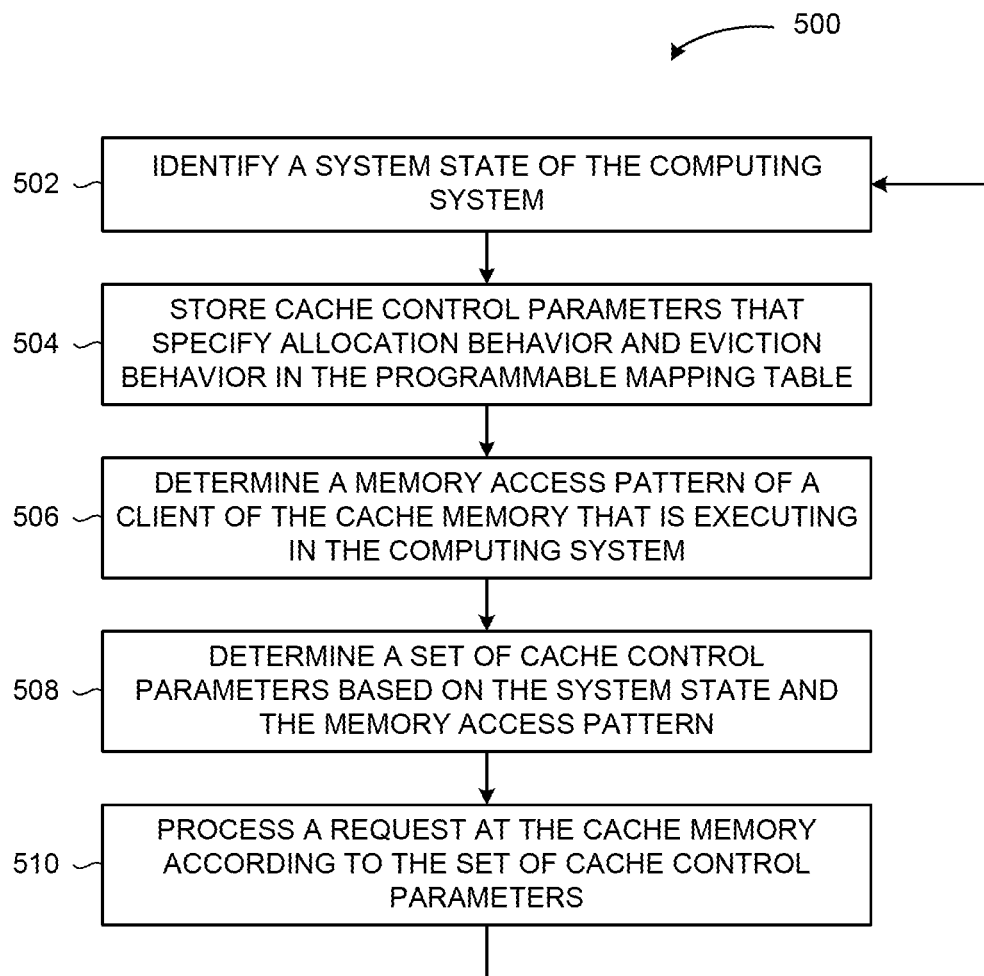
FIG. 5 is a flow diagram of method steps for managing the system level cache included in the computing system of FIG. 1, according to various embodiments.

FIG. 5 is a flow diagram of method steps for managing the system level cache included in the computing system of FIGS. 1-4, according to various embodiments. The method steps can be performed by a combination of the SLC policy manager 210, SLC clients 140, the programmable mapping table 230, and the system level cache 122. Additionally or alternatively, certain method steps can be performed by one or more processing units and/or alternative auxiliary processors including, without limitation, CPUs, GPUs, DMA units, IPUs, NPUs, TPUs, NNPs, DPUs, VPUs, ASICS, FPGAs, and/or the like, in any technically feasible combination. Although the method steps are described in conjunction with the systems of FIGS. 1-4, persons of ordinary skill in the art will understand that any system configured to perform the method steps, in any order, is within the scope of the present disclosure.

As shown, a method 500 begins at step 502, where a system level cache policy manager 210 included in a computing system 100 identifies a system state of the computing system. The system level cache policy manager 210 identifies system state based on data from various hardware components, including system level cache allocation and/or replacement controls, control circuitry that generates power state change notifications, system activity, bandwidth monitors that generate telemetry data, and/or the like. The system level cache policy manager 210 further identifies system state based on various software components, including a software mechanism for delivering component state change events to the system level cache policy manager 210, a software mechanism for determining the system configuration, operating system state and configuration information, and/or the like. The system level cache policy manager 210 monitors the state of individual clients, system activity of the computing system, and the power state of individual system level cache clients. Further, the system level cache policy manager 210 can receive information about the state of the operating system and about the applications executing on the various clients. In so doing, the system level cache policy manager 210 monitors system events including system related events and/or power related events delivered in the form of interrupts, event messages, and/or the like. System events represent telemetric data that measures various components of the computing system. Based on this telemetric data, the system level cache policy manager 210 detects known use cases and/or scenarios can be optimized for efficient access to the system level cache. These known scenarios can include video streaming, audio streaming, audiovisual conferencing, intensive computation, and/or the like.

At step 504, the system level cache policy manager 210 stores cache control parameters that specify allocation behavior, eviction behavior, and/or the like in a programmable mapping table 230. This characterization data can be determined a priori based on characterization and/or qualification of the various clients.

At step 506, each SLC client 140 executing in the computing system 100 determines a memory access pattern associated with that particular SLC client 140. More specifically, SLC clients 140 indicate a buffer type along with the corresponding memory access request. The buffer type distinguishes different types of buffers used by the SLC clients 140 that can benefit from different cache allocation policies.

At step 508, the system level cache 122 accesses the programmable mapping table 230 to determine a set of cache control parameters based on the system state and the memory access pattern. The system level cache 122 accesses the programmable mapping table 230 based on the {ARID, BufferType} vector to determine the set of cache control parameters for each given memory request.

At step 510, logic within the system level cache 122 processes a memory request according to the set of cache control parameters retrieved from the programmable mapping table 230. The parameters can cause the request to allocate a new cache line in the system level cache 122 or to not allocate a cache line. If a cache line is allocated, then the parameters can determine the LRU status, eviction class, decay interval, and/or any other parameters beneficial for making optimal eviction decisions. The method 500 then proceeds to step 502, described above, to continue to dynamically manage system level cache operation.

Note that the method 500 includes all of the steps to process a single memory request. In that regard, certain steps performed by the cache policy manager, such as step 502 and step 504, are performed less frequently than other steps, such as step 506, step 508, and step 510. In a specific example, step 502 and step 504 can be performed on the order of once per millisecond, whereas step 506, step 508, and step 510 can be performed for every memory request on the order of once per nanosecond or less. As a result, step 502 and step 504 can be performed independently from step 506, step 508, and step 510.

Figure 6:
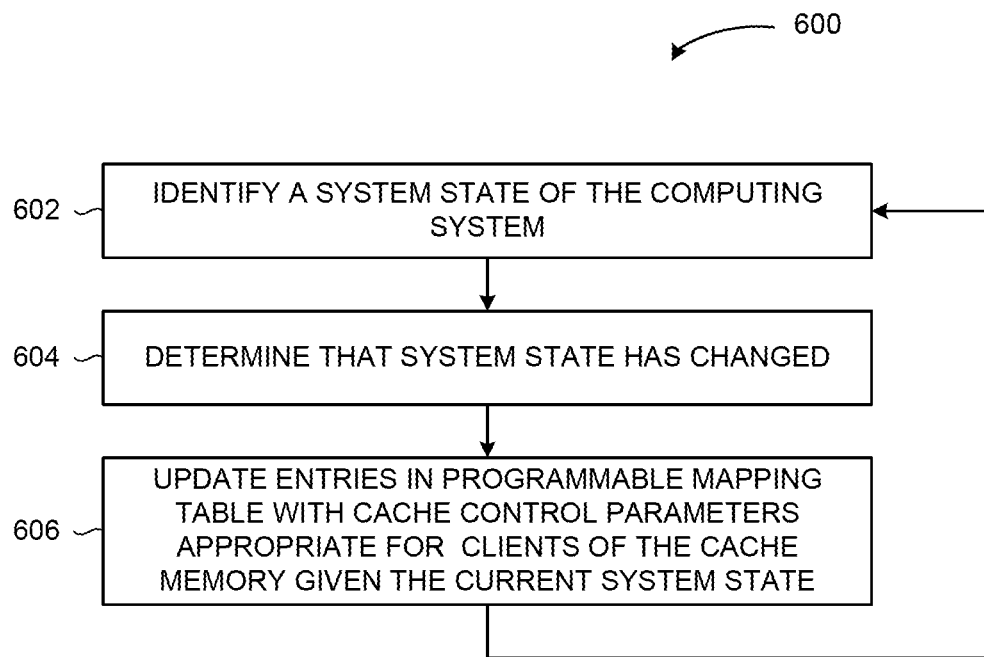
FIG. 6 is a flow diagram of method steps for updating the programmable mapping table in the system level cache included in the computing system of FIG. 1, according to various embodiments.

FIG. 6 is a flow diagram of method steps for updating the programmable mapping table 230 in the system level cache 122 included in the computing system 100 of FIGS. 1-4, according to various embodiments. The method steps can be performed by SLC policy manager 210. Additionally or alternatively, the method steps can be performed by one or more processing units and/or alternative auxiliary processors including, without limitation, CPUs, GPUs, DMA units, IPUs, NPUs, TPUs, NNPs, DPUs, VPUs, ASICs, FPGAs, and/or the like, in any combination. Although the method steps are described in conjunction with the systems of FIGS. 1-4, persons of ordinary skill in the art will understand that any system configured to perform the method steps, in any order, is within the scope of the present disclosure.

As shown, a method 600 begins at step 602, where a system level cache policy manager 210 included in a computing system 100 identifies a system state of the computing system. The system level cache policy manager 210 identifies system state based on data from various hardware components, including system level cache allocation and/or replacement controls, control circuitry that generates power state change notifications, system activity, bandwidth monitors that generate telemetry data, and/or the like. The system level cache policy manager 210 further identifies system state based on various other conditions, as described herein in conjunction with step 502 of FIG. 5.

At step 604, the system level cache policy manager 210 determines that the system state of the computing system has changed. The change in system state can be due to a system level cache memory client transitioning between an active state and a low-power state. Additionally or alternatively, the change in system state can be due to a system level cache memory client that initiates streaming operation or ceases streaming operation. Additionally or alternatively, the change in system state can be due to a change in activity directed at the system level cache memory by one or more system level cache memory clients.

At step 606, the system level cache policy manager 210 updates entries in the programmable mapping table 230 with cache control parameters appropriate for SLC clients 140 given the current system state. In so doing, the system level cache policy manager 210 updates the cache allocation and replacement policy currently in effect for each {ARID, BufferType} combination, and tuned for a previous system state, to new cache allocation and replacement policy that is tuned for the current system state. As a result, cache performance is improved by updating the cache allocation policy and/or cache replacement policy as the system state changes over time. The method 600 then proceeds to step 602, described above, to continue to update the programmable mapping table 230 as the system state changes.

In sum, various embodiments include techniques for managing cache memory in a computing system. The disclosed techniques dynamically detect various memory access use cases and select cache replacement policies that are well suited for the detected use case. The disclosed techniques include client caching hints, a programmable mapping table, cache policy controls, and an SLC policy manager. A first technique, referred to as client caching hints, is a hardware-based technique where each SLC client indicates a memory access pattern associated with the SLC client. A second technique is a hardware-based technique that employs a programmable mapping table (PMT). The programmable mapping table maps the ARID and the buffer type to the allocation and replacement controls of the SLC. A third technique, referred to as cache policy controls, is a hardware-based technique where the SLC implements one or more allocation and replacement controls that are applied to incoming requests, as determined by the relevant PMT table entry. A fourth technique is a technique where a software or firmware program referred to as an SLC policy manager monitors system state, detects and infers the memory access use case, and dynamically updates the programmable mapping table to optimize the use of the SLC.

At least one technical advantage of the disclosed techniques relative to the prior art is that, with the disclosed techniques, cache replacement policy management and cache partitions management are dynamically selected based on the memory access use case for various SLC clients. The techniques take both the current system state as well as client-provided (sub-stream) cacheability information into account. The techniques can concurrently achieve the benefits of multiple prior approaches, such as DRRIP approaches, state-based approaches, and client hint-based approaches. As with DRRIP approaches, the techniques can infer whether particular client streams can benefit from caching data or not. As with state-based approaches, the techniques can configure cache policy decisions based on the current system state. As with client hint-based approaches, the techniques can make different caching decisions for different types of requests from the same client. For example, the techniques can elect to not allocate cache memory for streaming data accesses from a client and allocate cache memory for data accesses from the same client that have a high likelihood of reuse. In this manner, the techniques can make optimal caching decisions for each client and access type, taking into account the current system state as well as client-provided sub-stream information. As a result, the techniques can result in improved cache memory utilization, performance, and power management relative to conventional approaches. In addition, the techniques are extendable, such that cache replacement policy management and cache partitions management can be applied for certain client types and data access types, and later expanded to be applied for other client types and data access types. Further, these techniques can be extended to recognize and optimize for additional use cases as those additional use cases are identified. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for managing a cache memory in a computing system, the method comprising:
    monitoring telemetric data that measures a system state of the computing system, wherein the system state identifies an application usage scenario for the computing system, the application usage scenario being mapped to a scenario-specific memory access pattern;
    determining whether the system state is consistent with a previously identified system state included in a set of previously identified system states;
    based on determining that the system state is consistent with a first previously identified system state included in the set of previously identified system states, updating a mapping table with table entry indices appropriate for each combination of client type identifier and buffer type for the first previously identified system state;
    based on determining that the system state is not consistent with any previously identified system state included in the set of previously identified system states, updating the mapping table with the table entry indices appropriate for each combination of client type identifier and buffer type for a default system state; and
    reading one or more cache control parameters from a table entry in the mapping table referenced by a table entry index.

2. The computer-implemented method of claim 1, wherein data regarding a memory request pattern for a first client is encoded into a buffer type attribute associated with the first client.

3. The computer-implemented method of claim 1, wherein a first client is designated by an identifier associated with a class of clients that have similar policies as at least one of an allocation policy associated with the first client or a replacement policy associated with the first client.

4. The computer-implemented method of claim 1, wherein each client included in a plurality of clients is associated with a unique identifier.

5. The computer-implemented method of claim 1, wherein a first client is associated with the same identifier as a second client included in a plurality of clients.

6. The computer-implemented method of claim 1, wherein the table entry associated with the table entry index based on the default system state specifies a default behavior that is compatible with, but not optimized for, the previously identified system state.

7. The computer-implemented method of claim 1, wherein the table entry associated with the table entry index based on the previously identified system state specifies a behavior that is optimized for the previously identified system state.

8. The computer-implemented method of claim 1, wherein the table entry includes at least one of cache allocation parameters or cache replacement parameters for memory requests from the first client that employ a buffer type indicated by a buffer type attribute.

9. The computer-implemented method of claim 1, further comprising concatenating a buffer type attribute with an identifier that is associated with at least one of an allocation policy or a replacement policy.

10. The computer-implemented method of claim 1, further comprising receiving a buffer type attribute from a first client along with a memory request.

11. A system, comprising:
    a memory;
    a plurality of cache memory clients that is coupled to the memory;
    a mapping table that maps a client type identifier and a buffer type associated with a request to a table entry index;
    a cache memory policy manager configured to:
        monitor telemetric data that measures a system state of the system, wherein the system state identifies an application usage scenario for the system, the application usage scenario being mapped to a scenario-specific memory access pattern;

determine whether the system state is consistent with a previously identified system state included in a set of previously identified system states;

based on determining that the system state is consistent with a first previously identified system state included in the set of previously identified system states, update the mapping table with table entry indices appropriate for each combination of client type identifier and buffer type for the first previously identified system state; and based on determining that the system state is not consistent with any previously identified system state included in the set of previously identified system states, update the mapping table with the table entry indices appropriate for each combination of client type identifier and buffer type for a default system state; and a cache memory controller configured to:

read one or more cache control parameters from a table entry in the mapping table referenced by a first table entry index included in the table entry indices.

12. The system of claim 11, wherein data regarding a memory request pattern for a first client is encoded into a buffer type attribute associated with the first client.

13. The system of claim 11, wherein a first client is designated by an identifier associated with a class of clients that have similar policies as at least one of an allocation policy associated with the first client or a replacement policy associated with the first client.

14. The system of claim 11, wherein each client included in a plurality of clients is associated with a unique identifier.

15. The system of claim 11, wherein a first client is associated with the same identifier as a second client included in a plurality of clients.

16. The system of claim 11, wherein the table entry associated with the table entry index based on the default system state specifies a default behavior that is compatible with, but not optimized for, the previously identified system state.

17. The system of claim 11, wherein the table entry associated with the table entry index based on the previously identified system state specifies a behavior that is optimized for the previously identified system state.

18. The system of claim 11, wherein the table entry includes at least one of cache allocation parameters or cache replacement parameters for memory requests from a first client that employ a buffer type indicated by a buffer type attribute.

19. The system of claim 11, wherein the cache memory policy manager is further configured to concatenate a buffer type attribute with an identifier that is associated with at least one of an allocation policy or a replacement policy.

20. The system of claim 11, wherein the cache memory policy manager is further configured to receive a buffer type attribute from a first client along with a memory request.

* * * * *